US007305091B1

(12) United States Patent
Hirano

(10) Patent No.: US 7,305,091 B1
(45) Date of Patent: Dec. 4, 2007

(54) QUANTUM CIPHER COMMUNICATION SYSTEM

(75) Inventor: Takuya Hirano, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 09/787,029

(22) PCT Filed: Aug. 10, 1999

(86) PCT No.: PCT/JP99/04328

§ 371 (c)(1),
(2), (4) Date: Mar. 13, 2001

(30) Foreign Application Priority Data

Sep. 24, 1998 (JP) .................................. 10-270149

(51) Int. Cl.
*H04K 1/00* (2006.01)
*H04L 9/00* (2006.01)
(52) U.S. Cl. ...................... 380/255; 380/256; 380/278; 380/279; 713/150
(58) Field of Classification Search ................ 380/278, 380/255–256, 204; 713/201, 200
See application file for complete search history.

(56) References Cited

U.S. PATENT DOCUMENTS

| 4,916,305 | A | * | 4/1990 | Antell ........................ 257/184 |
| 5,007,106 | A | * | 4/1991 | Kahn et al. .................. 398/203 |
| 5,086,349 | A | * | 2/1992 | Okayama et al. ............. 398/48 |
| 5,307,410 | A | * | 4/1994 | Bennett ....................... 380/256 |
| 5,339,182 | A | * | 8/1994 | Kimble et al. ............... 398/158 |
| 5,515,438 | A | * | 5/1996 | Bennett et al. .............. 380/278 |
| 5,663,793 | A | * | 9/1997 | de Groot ..................... 356/491 |
| 5,665,423 | A | * | 9/1997 | Lee .............................. 438/88 |
| 5,675,648 | A | * | 10/1997 | Townsend .................... 380/278 |

(Continued)

FOREIGN PATENT DOCUMENTS

JP 08-139701 5/1996

(Continued)

OTHER PUBLICATIONS

M.J. Werner and G. J. Milburn. Eavesdropping using quantum-nondemolition measurements. Department of Physics, University of Queensland, Australia. vol. 47, No. 1, p. 639-641.*

(Continued)

*Primary Examiner*—Kim Vu
*Assistant Examiner*—Ponnoreay Pich
(74) *Attorney, Agent, or Firm*—Westerman, Hattori, Daniels & Adrian, LLP.

(57) ABSTRACT

A quantum cipher communication system includes a sender's apparatus, a recipient's apparatus and a transmission path. The sender's apparatus includes a beam splitting for splitting a laser beam into a weak signal light and an intense reference light, a phase modulation unit for imparting a phase change on either the weak signal light or the intense reference light. The recipient's apparatus includes a phase modulation unit for imparting a phase change on either the weak signal light or the intense reference light, a superimposing unit for superimposing the weak signal light and the intense reference light, a pair of photoconductive diodes for converting two output lights from the superimposing unit into electric signals, and an amplifying unit for amplifying a difference signal between the electric signals, wherein the recipient assigns bit values by comparing the difference signal with threshold values.

10 Claims, 7 Drawing Sheets

U.S. PATENT DOCUMENTS

| | | | | |
|---|---|---|---|---|
| 5,732,139 | A | * | 3/1998 | Lo et al. .................. 380/28 |
| 5,953,421 | A | * | 9/1999 | Townsend .................. 380/283 |
| 6,188,768 | B1 | * | 2/2001 | Bethune et al. ............. 380/278 |
| 6,272,224 | B1 | * | 8/2001 | Mazourenko et al. ....... 380/283 |

FOREIGN PATENT DOCUMENTS

WO      WO 9408409 A1 * 4/1994

OTHER PUBLICATIONS

H. Bartelt and K. H. Brenner. The Wigner Distribution Function—An Alternate Signal Representation in Optics. 1980. Physikalisches Institut der Universitat Erlangen. p. 260-262.*

Samuel Braunstein, "Homodyne Statistics", Jul. 1990, Physical Review A, vol. 42, No. 1, pp. 474-481.*

Hirano et al, "Quantum cryptography using balanced homodyne detection", Sep. 5, 2004, pp. 1-5.*

Hansen et al, "Ultrasensitive pulsed, balanced homodyne detector: application to time-domain quantum measurements", Nov. 1, 2001, Optics Letters, vol. 26, No. 21., pp. 1714-1716.*

Barnett et al, "Eavesdropping strategies and rejected-data protocols in quantum cryptography", Journal of Mordern Optics, 1993, vol. 40, No. 12, pp. 2501-2513.*

Paul Townsend, "Secure Communications on Passive Optical networks Using Quantum Cryptography", 22nd European Conference on Optical Communication, 1996, pp. 3.35-3.38.*

Charles Bennett, "Quantum Cryptography Using Any Two Nonorthogonal States", Physical Review Letters, vol. 68, No. 21, May 25, 1992, pp. 3121-3124.*

Goldenberg et al, "Physical Review Letters", vol. 75, No. 7, Aug. 14, 1995, pp. 1239-1243.*

Bennett et al, "Generalized Privacy Amplification", IEEE Transactions on Information Theory, vol. 41, No. 6, Nov. 1996, pp. 1915-1923.*

M. J. Werner, G.J. Milburn; "Eavesdropping using quanturn-nondemolition measurements", Physcial Review A, vol. 47, No. 1 (1993) p. 639-641.

H.Bartelt, K.-H.Brenner; "The Wigner Distribution Function An Alternative Signal Represetion in Optics", Israel Journal of Technology, vol. 18, No. 5 (1980) p. 260-262.

Fukushima S., Kaibuchi, S., "Shinpan: Tsuu-fibaa Tsuushin", Kabushiki Kaisha Denkitsuuchin Gijutsu Nyuusu Sha (Dec. 12, 1981), p. 252-3.

C. Marand, P.D. Townsend; "Quantum key distribution over distances as long as 30km.", Optics Letter, vol. 20, No. 12 (1995) p. 1695-1697.

Yi Mu, Yuliang Zheng, Yan-Xia Lin; "Multi-User Quantum Cryptography" International Symposium on Information Theory & Its Application 1994, vol. 1 (1994) p. 245-250.

B.A. Slutsky, R. Rao, P.-C.Run, Y. Fainman; : "Security of cryptography aganist individual attacks", Physical Review A, vol. 57, No. 4 (1998) p. 2383-2398.

Hideaki Matsueda; "Quantum Cryptography", The Journal of the Institute of Electronics, Information and Communication Engineers, vol. 81, No. 3 (1998) p. 225-320.

John F. Clauser et al., "*Experimental consequences of objective local theories*", Physical Review D, vol. 10, No. 2, Jul. 15, 1974, pp. 526-535.

R. Namiki et al. "*Security of quantum cryptography using balanced homodyne detection*", The American Physical Society, Physicial Review A 67, Feb. 24, 2003, pp. 022308-1 to 022308-7.

R. Namiki et al, "*Practical Limitation for Continuous-Variable Quantum Cryptography using Coherent States*", The American Physical Society, Physical Review Letters, vol. 92, No. 11, Mar. 16, 2004, pp. 117901-1 to 117091-4.

Mathematical Science pp. 53-61 (No. 42, Dec. 1996) with corresponding English translation (from line 4 from the bottom at right column on p. 56 to Fig. 4 on 58).

* cited by examiner

FIG. 5

| 1 | 270 | 90 | 180 | 90 | 270 | 90 | 270 | 0 | 90 | 180 | 90 | 270 |
|---|-----|----|-----|----|-----|----|-----|---|----|-----|----|-----|
| 2 | 0 | 90 | 90 | 0 | 0 | 90 | 90 | 0 | 90 | 90 | 0 | 90 |
| 3 | 270 | 0 | 90 | 90 | 270 | 0 | 180 | 0 | 0 | 90 | 90 | 180 |
| 4 | + | + | − | + | + | + | − | + | + | + | − | − |
| 5 | × | ○ | × | × | × | ○ | ○ | ○ | ○ | × | × | ○ |
| 6 |   | 1 |   |   | 1 | 0 | 1 | 1 |   |   |   | 0 |
| 7 |   | 1 |   |   | 1 | 0 | 1 | 1 |   |   |   | 0 |

FIG. 7

| 1 | 100 | <u>180</u> | <u>90</u> | 150 | <u>90</u> | 130 | 120 | <u>90</u> | <u>180</u> | 160 | <u>270</u> | 70 |
|---|-----|-----|----|-----|----|-----|-----|----|-----|-----|-----|-----|
| 2 | 0   | 90  | 90 | 0   | 0  | 90  | 90  | 90 | 0   | 90  | 90  | 90  |
| 3 | 100 | 90  | 0  | 150 | 90 | 40  | 30  | 0  | 180 | 70  | 180 | 340 |
| 4 | +   | −   | +  | −   | +  | +   | −   | +  | −   | +   | −   | −   |
| 5 | 100 | 90  | ○  | 150 | 90 | 40  | 30  | ○  | ○   | 70  | ○   | 340 |
| 6 |     | 1   |    |     |    |     |     | 1  | 0   |     | 0   | 0   |
| 7 |     | 1   |    |     |    |     |     | 1  | 0   |     | 0   | 0   |

QUANTUM CIPHER COMMUNICATION SYSTEM

TECHNICAL FIELD

This invention relates to a quantum cipher communication system that can be used in distributing privacy (secret) keys in order to ensure security of communication. In particular, it relates to a quantum cipher communication system designed to measure or observe the quantum mechanical state of a signal being transmitted and to detect such a signal at a substantially high quantum efficiency.

BACKGROUND ART

The conventional cipher technologies which are designed to ensure security of communication include a privacy key cipher system that makes use of a common privacy key which is known only to proper parties of communication, and a public key cipher system that has recourse to a pair of keys, given by a privacy and a public key.

Cryptology of the public key cipher system relies for its secrecy retainability on the fact that for example, factoring an extremely large integer is hard to compute. However, progresses in performance of computers, and advancements in distributed processing techniques using networks have made security by that system no longer perfect.

In contrast, if a privacy key known only to legitimate parties of communication can be held in common by the sender and recipient, an absolutely secure communication may be realized. In such recognition in the art, a technique called quantum cipher communication has in the recent decade been proposed that seeks secrecy retainability for a privacy key to be distributed in a quantum-mechanical principle (J. Cryptology, 5, 3-28 (1992), C. H. Bennett et al).

If the principle of quantum mechanics is applied that an action to observe or measure necessarily gives a disturbance to an object observed or measured, any attempt by a wiretapper to wiretap gives a change in a signal being transmitted.

It therefore follows that monitoring a signal to find a change in it can divulge the presence of a wiretapper. In specific terms, using a quantum cipher allows a privacy key with high secrecy retainability to be prepared and held in common by and between parties at two sites spaced distant. For effecting a quantum ciphering operation or encryption it is conventional to use a light as the carrier of a transmission signal. And it has been the common practice to detect a signal light by the photon counting method, a light detecting technique, that uses a detector which in response to one or more photons incident upon generates electric pulses at a certain given probability called quantum efficiency.

However, the quantum cipher communication systems so far proposed that rely on the photon counting method have failed to be practical because of the problems unresolved, both on its principle and technologically, which accrue from the method.

First, the problem on the principle is that the inability to check up on the quantum mechanical state of a signal light once it has been transmitted prevents detecting a wiretap if the wiretapper has taken a sophisticated measure such as a quantum nondestructive measurement. Stated otherwise, since a wiretapper is able to read information on the number of photons in a signal light without giving a change in that number of the photons (the effect of a measurement does appear as a change in phase), it follows that counting only the number of photons after transmission allows wiretapping to remain unnoticed.

Further, there exists the technological problem that a detector is unavailable having a high quantum efficiency enough to meet with lights of 1.3 µm or 1.5 µm in wave length for common use now in light communication systems. Not only does a loss in detection reduce the transfer rate for data, but on the principle it does not give a distinction from an attempt to wiretap.

It is accordingly an object of the present invention to provide a quantum cipher communication system that permits measuring a signal being transmitted in its quantum mechanical state. It is also an object of the present invention to provide a quantum cipher communication system that permits detecting the signal being transmitted at a substantially high quantum efficiency.

DISCLOSURE OF THE INVENTION

In order to achieve the objects mentioned above, the present invention provides, a quantum cipher communication system in quantum cipher communication using a light signal, which system is characterized by the step of detecting wiretapping based on a change in a quantum-mechanical probability distribution defined by an amplitude and a phase of a difference signal derived from a signal light which change is produced by a wiretapping operation.

The system so constructed as above permits monitoring a signal being transmitted in its quantum mechanical state and thereby allows detecting a wiretap using a sophisticated measure such as a quantum nondestructive measurement, which has hitherto been hard to detect.

The present invention also provides a quantum cipher communication system in quantum cipher communication using a light signal, which system is characterized by the steps of: splitting a light signal from a transmission source side into an intense reference signal and a weak transmission signal which is so weak that a change in its quantum mechanical state is detectable; imparting a phase difference between the said reference signal and the said transmission signal while they are in a process of transmission; superimposing in a transmission receiving side the said reference signal and the said transmission signal to form two output lights which are opposite in phase and producing a difference signal which is represented by a difference between the said two output lights; deriving a frequency distribution of the said difference signal as a function of a fluctuation of the quantum state of the said transmission signal; based upon or in accordance with the frequency distribution of the said difference signal, making privacy (secret) keys respectively at the said transmission source and receiving sides for holding in common thereby; and directly observing the fluctuation of the quantum state of the said transmission signal.

The system so constructed as described above permits detecting a transmission signal at an efficiency as high as its theoretical upper limit, by virtue of using a reference signal which is intense.

The present invention also provides a quantum cipher communication system which includes: a first beam splitter for splitting a light from a light source into a transmission signal and a reference signal; a phase modulating means for imparting a phase modulation to the said transmission signal; a light attenuator for converting the said transmission signal into a weak transmission signal which is so weak that a change in its quantum state is detectable; and a phase modulating means for imparting a phase modulation to the said reference signal, and which system also includes, operative after a relative phase difference is imparted between the said transmission and reference signals: a second beam splitter for superimposing the said phase-modulated weak transmission signal and the said phase modulated intense reference signal to form two output lights; a first and a second photoelectric conversion elements for converting the said two output lights from the said second beam splitter into two corresponding electric signals which are opposite in phase; and an amplifier for amplifying a difference signal representative of a difference between the said two output lights to output an amplified corresponding voltage.

The system so constructed as described above permits splitting a light signal from a transmission source side into an intense reference signal and a weak transmission signal which is so weak that a change in its quantum mechanical state is detectable; imparting a phase difference between the reference signal and the transmission signal while they are in a process of transmission; superimposing in a transmission receiving side the reference signal and the transmission signal to form two output lights which are opposite in phase and producing a difference signal which is represented by a difference between the two output lights; deriving a frequency distribution of the difference signal as a function of a fluctuation of the quantum state of the transmission signal; based upon or in accordance with the frequency distribution of the difference signal, making privacy (secret) keys respectively at the transmission source and receiving sides for holding in common thereby; and observing the fluctuation of the quantum state of the transmission signal. Therefore, detection at a high efficiency and measurement of a signal light in its quantum state are realized.

In a quantum cipher communication system according to the present invention, the said phase modulating means preferably includes a mirror movable by a distance as small as the wave length of an incident light. The system so constructed, allows a phase modulation or change to be made with ease.

In a quantum cipher communication system according to the present invention, the said reference signal and the said transmission signal are split both in time and as polarized and then transmitted to travel along a common path. The system so constructed and with the common path constituted by a single optical fiber provides a quantum cipher communication system between two sites spaced across a long distance.

Further, the present invention provides a quantum cipher communication system which includes: a first beam splitter for splitting a light from a light source into a transmission signal and a reference signal; a first light polarizer for polarizing the said transmission signal through one of two long distance paths; a light attenuator for converting the said transmission signal into a weak transmission signal which is so weak that a change in its quantum state is detectable; a first phase modulating means for imparting a predetermined phase modulation to the said transmission signal; and a first polarized beam splitter for receiving the said intense reference signal having passed through one of two short distance paths and the said transmission signal and returning the received signal to travel along a common optical path, which system also includes, operative after a relative phase difference is imparted between the said transmission and reference signals and included in a transmission receiving side: a second polarized beam splitter for isolating from each other the said transmission and reference signals transmitted through a single optical fiber; a second phase modulating means for imparting a phase modulation to the said isolated transmission signal through the other of the said two short distance paths; and a second light polarizer for polarizing the said isolated reference signal through the other of the said two long distance paths, and which system further includes: a second beam splitter for superimposing the said transmission and reference signals which are coincident with each other in time and polarization to produce two output lights; a first and a second photoelectric conversion elements for converting the said two output lights into corresponding electric signals; and an amplifier for amplifying a difference signal representative of a difference between the said two output lights to output an amplified corresponding voltage.

The system so constructed as described above permits the transmission and reference signals to travel in different paths only in the sender and recipient sides and each of a short distance and for the most part along a common path of transmission. Thus, a variation of the relative difference in optical path between the two signal lights can be made small.

In a quantum cipher communication system according to the present invention, there is preferably included a third light polarizer in an output side of the said optical fiber for making a correction for a disturbance of polarization of the said reference signal.

The system so constructed as described above using the intense reference signal allows effective correction for disturbance in polarization of light or polarized light signals while in transmission through the optical fiber.

Further, in a quantum cipher communication system according to the present invention, preferably threshold values are established, respectively, for positive and negative values of the said difference signal, and that the state of the said transmission signal is discriminated on the basis of the said threshold values.

The system so constructed as described above and establishing threshold values permits practical detection efficiency and error rate as desired in accordance with the intensity of a transmission signal.

Also, in a quantum cipher communication system according to the present invention, preferably in addition to the phase modulations designed to transmit privacy keys, such a phase modulation is so imparted as described and having a value later determined for making a correction for a fluctuation of the difference in optical path between the said reference signal and the said transmission signal which develops by reason of an external cause.

The system so constructed as described above and giving, besides phase modulations designed to produce privacy keys, a phase modulation with a value later determined allows correcting a fluctuation of the difference in optical path and measuring the quantum mechanical state concurrently with producing quantum ciphers.

Also, a quantum cipher communication system according to the present invention is characterized in that phase modulations that monotonically increase and phase modulations that are randomly applied may be repeated. The system so constructed correcting a fluctuation of the difference in optical path and measuring the quantum mechanical state simultaneously.

Also, a quantum cipher communication system according to the present invention is characterized in that a wiretap is detected on the basis of an increase in the error rate of the said difference signal. The system so constructed notes that the error rate in a privacy key increases as the probability that an improper phase modulation by wiretapping is performed increases and thus permits detecting the presence of wiretapping.

Further, a quantum cipher communication system according to the present invention is characterized in that a wiretap is detected on the basis of a change in a Wigner distribution function that indicates a quantum mechanical state of the said difference signal. The system so constructed notes that if a transmission signal as separated in part is wiretapped, its amplifying process is necessarily accompanied by a quantum fluctuation which causes a change in the Wigner distribution function. Hence, from a change in the Wigner distribution function, wiretapping can be detected.

Also, a quantum cipher communication system according to the present invention is characterized in that the said two output lights are converted into corresponding electric signals through photoconductor diodes. The system so constructed allows performing measurement at a high quantum efficiency and at a good S/N ratio.

Further, a quantum cipher communication system according to the present invention is characterized in that for the said photoconductor diodes, use is made of silicon photoconductor diodes when the light has a wave length of 600 nm to 900 nm, and of InGaAs photoconductor diodes when the light has a wave length of 1000 nm to 1500 nm. The system so constructed allows performing measurement at a high quantum efficiency and at a good S/N ratio.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof.

FIGS. 2A and 2B are graphical representations that explain a signal that is observed in a recipient side for a signal light with a fluctuation in its quantum mechanical state not taken into account in a quantum cipher communication system according to the present invention in which FIG. 2A is a graphical representation showing a relationship of the numbers of photons incident onto a pair of photoconductor diode with respect to a relative difference in optical path between a reference signal light and a quantum signal light with a diagram inserted showing in enlargement the relationship in a range in which the difference in optical path is close to zero, and FIG. 2B is a graphical representation of a signal difference between the reference signal light and the quantum signal light;

FIG. 5 is a tabular diagram that illustrates a quantum cipher or encryption procedure according to the present invention in which in the left hand side column, numeral 1 is used to indicate a phase modulation of a sender, numeral 2 a phase modulation of a recipient, numeral 3 a sum total of the sender's and recipient's phase modulations, numeral 4 a result of measurement by the recipient, numeral, numeral 5 indicating that the sender notified by the recipient on a public communication line of the recipient's added phase modulation notifies the recipient on a public communication line of mark ○ or OK when the sum total of the sender's and recipient's phase modulations becomes equal to 0 or 180 degrees, and X or NG (no good) when it becomes equal to 90 or 270 degrees, numeral 6 indicating that the recipient makes a privacy (or secret) key when ○ is obtained by assigning bit 1 to plus (+) and bit 0 to minus (−), and numeral 7 indicating that the sender makes a privacy key by assigning bit 1 when the sum total is 0 or 90 degrees and bit 0 when the sum total is 180 or 270 degrees;

FIG. 7 is a tabular diagram that illustrates a quantum cipher or encryption procedure for the system in the second form of embodiment shown in FIG. 6.

BEST MODES FOR CARRYING OUT THE INVENTION

Figure 1:
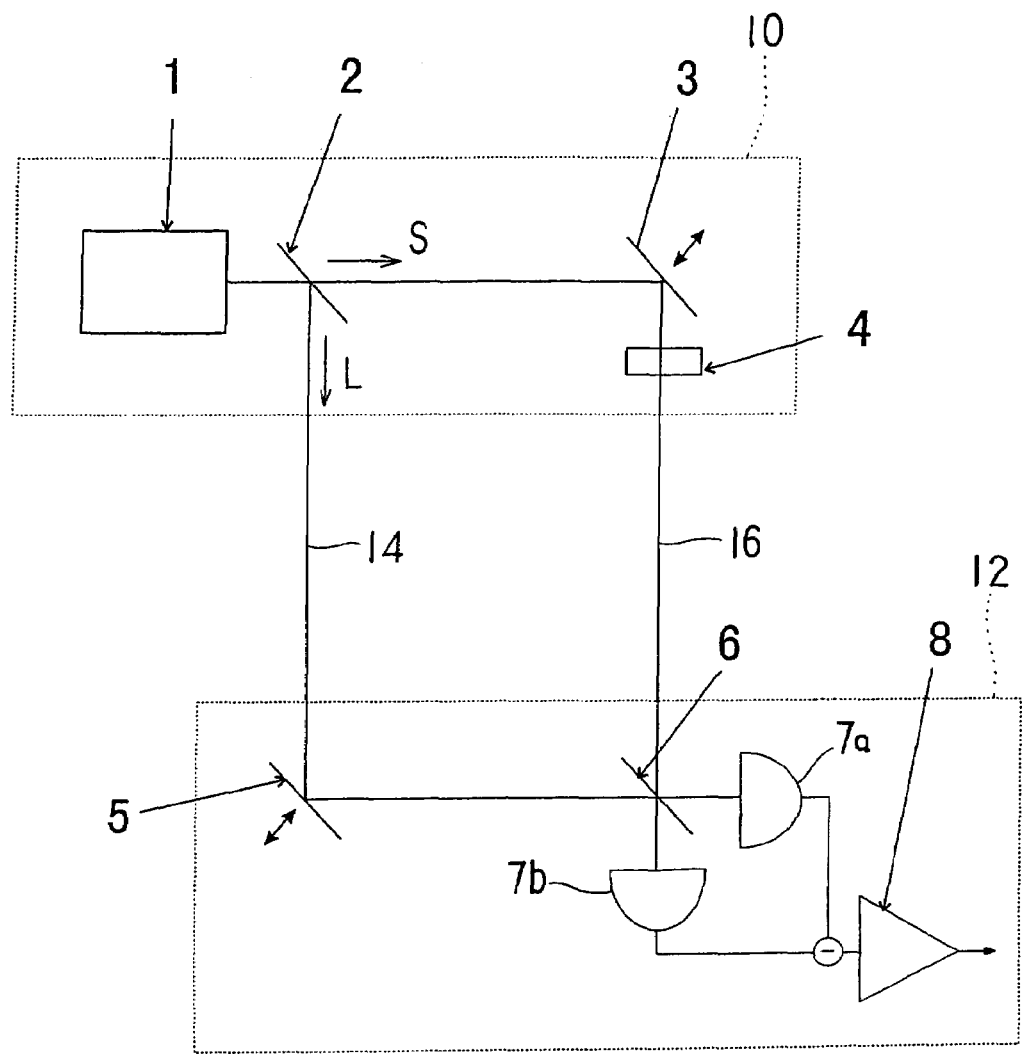
FIG. 1 is a schematic diagram that illustrates a first form of embodiment of a quantum cipher communication system according to the present invention.

Hereinafter, the present invention will be described in detail with reference to suitable forms of embodiment thereof illustrated in the drawing figures. While the present invention will hereinafter been set forth with respect to certain illustrative forms of embodiments thereof, it will readily be appreciated to be obvious to a person skilled in the art that many alternations thereof, omissions therefrom and additions thereto can be made without departing from the essences of scope of the present invention. Accordingly, it should be understood that the invention is not intended to be limited to the specific forms of embodiment thereof set forth below, but to include all possible forms of embodiment thereof that can be made within the scope with respect to the features specifically set forth in the appended claims and encompasses all the equivalents thereof.

A detailed description will first be given in respect of a typical, first form of embodiment of a quantum cipher communication system of the present invention.

FIG. 1 is a schematic diagram that illustrates a quantum cipher communication system implemented in a first form of embodiment according to the present invention.

Referring to FIG. 1, the quantum cipher communication system in this form of embodiment of the invention comprises an apparatus in a sender's side 10, a pair of paths of transmission 14 and 16 and an apparatus in a recipient's side 12. The sender's apparatus 10 includes a light source for a laser beam 1, a beam splitter 2, a mirror 3 and a light attenuator 4.

A light from the laser light source 1 is split into a reference light L and a quantum signal light S by the beam splitter 2.

The mirror 3 that reflexes the signal light S is adapted to be movable by a distance which is as small as the wave length of the signal light S to make a phase change of the signal light S and hence a relative phase difference between the reference and signal lights L and S.

The light attenuator 4 is used to attenuate the quantum signal light S to an extent that it has a typical intensity which is so weak as it corresponds to a single photon or so and such that a change in its quantum mechanical state is detectable The reference light L is endowed with a typical intensity which is so intense as it corresponds to photons as large as 10 millions in number. Thus, the reference light L is adjusted to be extremely higher than and radically different in intensity from the signal light S.

Thus, using the reference light L which is so intensified and made much stronger than the signal light which is so weak as described permits efficient detection and measuring such a quantum signal light S in its quantum state.

The recipient apparatus 12 includes a mirror 5 adapted to be movable by a distance which is as small as the wave length of the light, a beam splitter 6 which has a transmittance and reflectance equal to each other, a pair of photoconductor diodes 7a and 7b, and an output unit 8 comprising an amplifier and a voltage measuring device.

The recipient may alter the relative phase difference between the reference and signals lights L and S. Then, these lights L and S are superimposed on the beam splitter 6. The two output lights from the beam splitter 6 then come incident on the photoconductor diodes 7a and 7b, respectively, for conversion into respective electric signals. Then, a difference between these signals is amplified and an output voltage is measured and taken as a signal difference by an detector. For the amplifier, use is made of a charge sensitive amplifier a typical gain of which is 30 volts/pC (pico colulombs). Then, if the signal difference contains ten thousands (10,000) electrons the output voltage will have a magnitude of 50 mV.

For the photoconductor diodes 7a and 7b, use is made of the Si type for a light having a wave length of 600 to 900 nm and of the InGaAs type for a light having a wave length of 1000 to 1500 nm. Then, a quantum efficiency as high as 90% or more and in the optimum case 99% or more can be obtained. Thus, in the optimum case, for example, ten thousands (10,000) photons making up the intense reference light L can be converted into ninety nine hundreds (9900) electrons whose number can be measured at a good S/N ratio.

An explanation is next given in respect of signal processing by the recipient. In the description that follows it is assumed for the sake of simplicity that the photoconductor diodes 7a and 7b have a quantum efficiency of 100% and the amplifier has a noise negligible.

Referring to FIG. 1, the signal light S and the reference light L split into by the beam splitter 2 and then separately transmitted along their own optical paths are superposed at the beam splitter 6 where a difference in optical path between these lights causes an interference.

However, an extreme difference in intensity between the two lights renders the resulting interference pattern or fringe rather unclear.

Figure 2A:
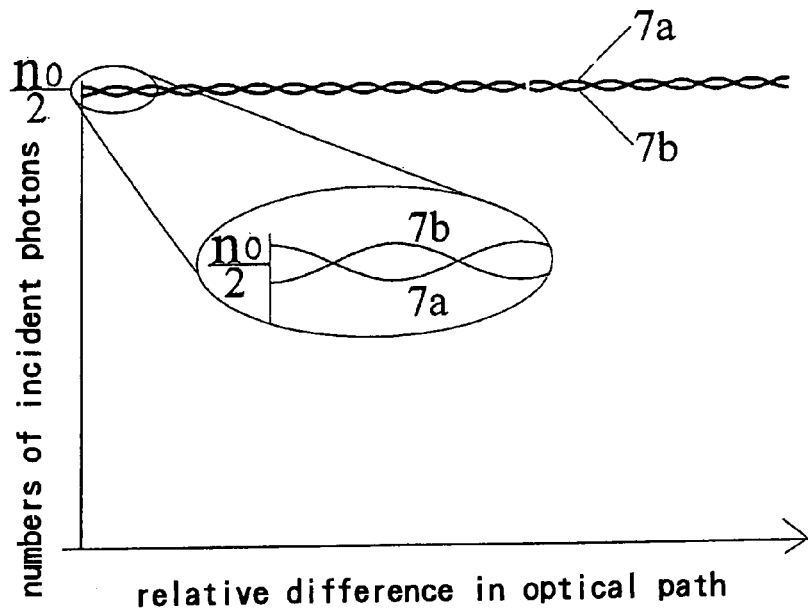
Figure 2B:
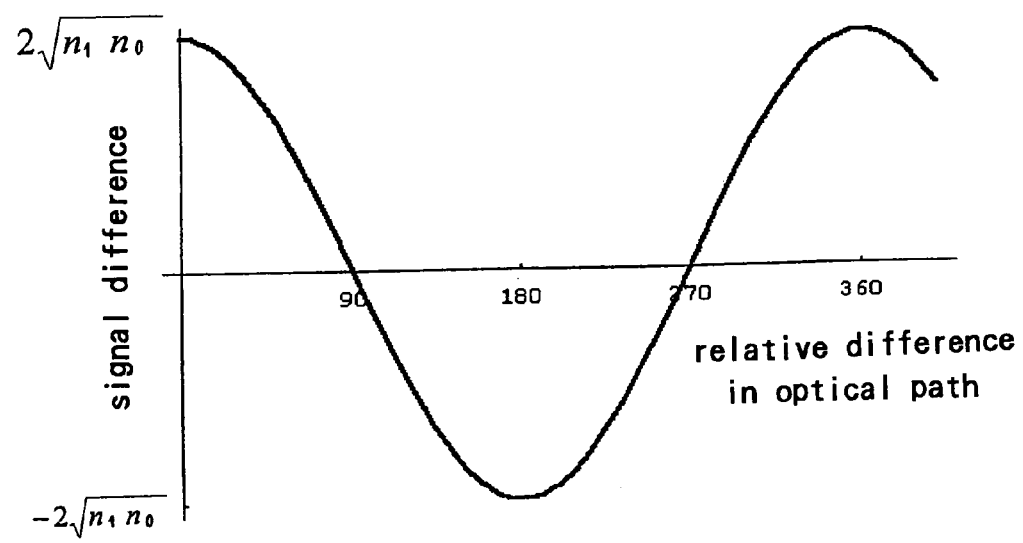
Figure 3A:
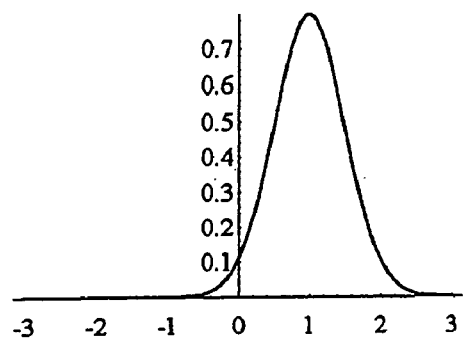
FIGS. 3A to 3D are graphical representations that explain a signal that is observed in a recipient side for a signal light with a fluctuation in its quantum mechanical state taken into account, the signal being shown for an optical path difference of 0 degree, 90 degrees ($\lambda/4$), 180 degrees ($\lambda/2$), and 270 degrees ($3\lambda/4$), respectively, in which in each graph the abscissa represents the magnitude of a signal difference and the ordinate represents the probability that the signal difference is measured.
Figure 3B:
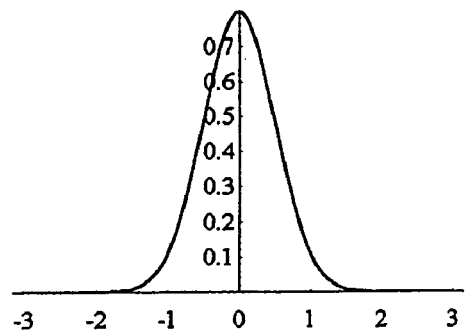
Figure 3C:
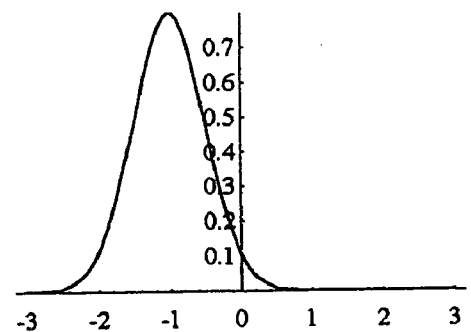
Figure 3D:
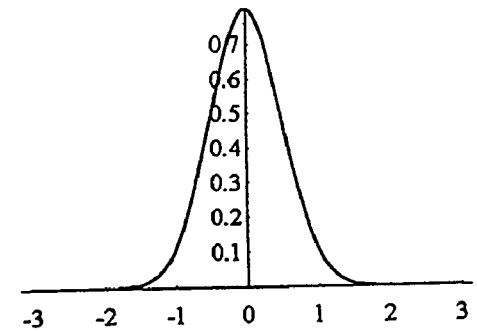

FIGS. 2A and 2B are graphical representations that explain a signal that is observed in the recipient side for a signal light with a fluctuation in its quantum mechanical state not taken into account. There, FIG. 2A is a graphical representation showing a relationship of the numbers of photons incident onto the photoconductor diodes with respect to a relative difference in optical path between the reference signal light and a quantum signal light with a diagram inserted showing in enlargement the relationship in a range in which the difference in optical path is close to zero, and FIG. 2B is a graphical representation of a signal difference between the reference signal light and the quantum signal light.

The beam splitter 6 is here so adjusted that in the absence of a signal light S it splits the reference signal L into two at a ratio of 1/1. Therefore, the number of photons which are incident onto each of the two photoconductor diodes 7a and 7b measures one half of the number of photons of the reference light L: $n_0$, hence $n_0/2$. Thus, as shown in FIG. 2A, with the value $n_0/2$ as its center a small interference pattern or fringe appears according to a relative difference in optical path between the two lights L and S. With the output signals which the two photoconductor diodes 7a and 7b provide for the strength or weakness of the interference fringe being in opposite phase with each other, finding the difference between the two output signals (difference signal) allows locating the very portion of the interference pattern itself as indicated in FIG. 2B. In this case, the amplitude of the interference pattern may be expressed by twice the square root of the product of the number of photons $n_1$ of the signal light S and the number of photons $n_0$ of the reference light L, namely by $2\sqrt{n_1}\sqrt{n_0}$. It should be noted in this connection that the amplitudes of the signal light S and the reference light L are each the square root of the number of photons and are thus $\sqrt{n_1}$ and $\sqrt{n_0}$, respectively. Hence, the maximum value of the difference between the signals incoming and thus outgoing of the photoconductor diodes 7a and 7b can be expressed by:

$$[(\sqrt{n_1}+\sqrt{n_0})^2/2-(\sqrt{n_1}\sqrt{n_0})^2/2]=2\sqrt{n_1}\sqrt{n_0}$$

It should further be noted that those indicated above each represent an average value that can be derived from a large number of measurements, and that each of the measurements for the difference signal, that is the difference in magnitude between the signals (indicating the two output lights in opposite phase from the beam splitter 6), involves a fluctuation in value due to a quantum fluctuation of the signal light represented by a standard deviation of $\sqrt{n_0}$.

FIGS. 3A to 3D are graphical representations that explain a difference signal that is measured in a recipient side with a fluctuation in the quantum mechanical state of the signal light taken into account. There, the signal is shown for an optical path difference in terms of phase difference of 0 degree, 90 degrees ($\lambda/4$), 180 degrees ($\lambda/2$), and 270 degrees ($3\lambda/4$), respectively. And in each graph the abscissa represents the magnitude of a difference signal and the ordinate represents the probability that the difference signal is measured It should be noted as regards the above that character $\lambda$ designates the wave length of the light and that the abscissa in each of the graphs is normalized by dividing the difference signal by $2\sqrt{n_0}$.

As shown in FIGS. 3A to D, the frequency distribution of the difference signal found if the quantum signal light S is in a coherent state in which an average number of photons is as small as 1 is represented by a Gaussian distribution as a function of the relative difference in optical path (in terms of phase difference) between the quantum signal light S and the reference light L. FIGS. 3A, 3B, 3C and 3D show that the Gaussian distribution has an average value of +1, 0, −1 and 0, when the optical path difference is 0, 90, 180 and 270 degrees, respectively, each with a standard deviation of 0.5.

Therefore, in order to execute ciphering or encryption, the recipient is allowed to use the results of measuring the difference signal to determine if the optical path difference is either 0 degree or 180 degrees. Thus, the recipient is just required to discriminate between the patterns of FIGS. 3A and 3C. To do this, threshold values X− and X+ may be set and finding the difference signal to be equal to or greater than X+ and to be equal to or less than X− allows the recipient to determine the optical path difference to be 0 and 180 degrees, respectively.

In this way, establishing the threshold values X− and X+ permits the effective detection efficiency and error rate to be given with freedom. For instance, with the assumption that where n1=1 as above, X−=X+=0, the probability that the optical path difference when it is 0 degree is judged to be 0 degree is as high as 97.7% which is given by integrating the Gaussian distribution from [(average value)−(twice the standard deviation)] to infinity. On the other hand, the probability (error rate) that the optical path difference when it is actually 180 degrees is misjudged to be 0 degree is as low as 2.28% which is given by integrating the Gaussian distribution from [(average value)+(twice the standard deviation)] to infinity. Also, if X−=−0.5 and X+=0.5 are assumed, computation likewise gives a detection probability reduced to 84.1%, but yields an error rate reduced to as low as 0.13%, thus giving rise to the performance much higher than that which has so far been achievable.

Figure 4A:
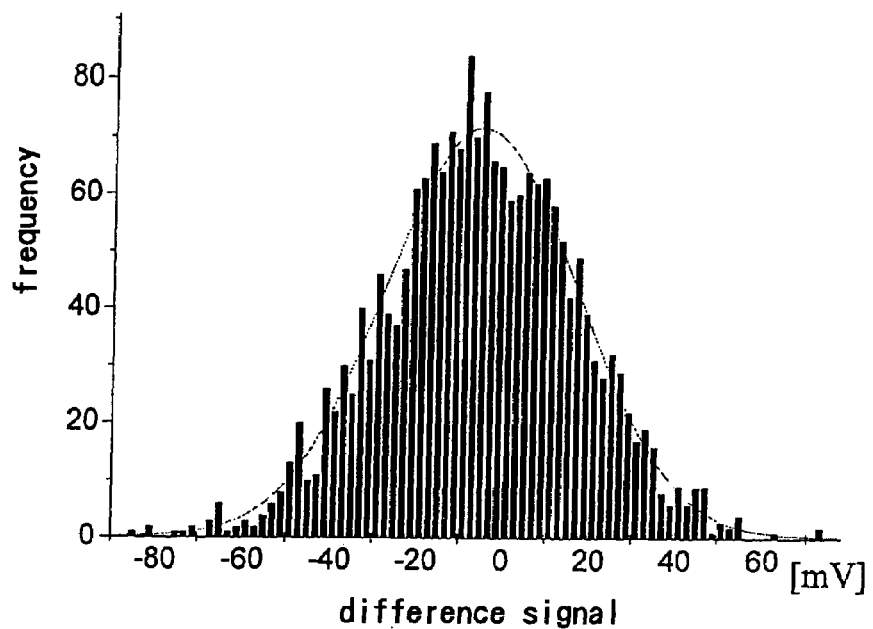
FIGS. 4A and 4B are graphical representations that illustrate typical measurement results that were obtained according to the first form of embodiment of the present invention in which the graph of FIG. 4A shows a frequency distribution for the difference signal taken along the ordinate with respect to the voltage actually measured 5000 times and taken along the abscissa and the graph of FIG. 4B illustrates a Wigner distribution function derived by computer tomography from data that were obtained when such a measurement made to obtain the result shown in FIG. 4A were repeated 30 times.
Figure 4B:
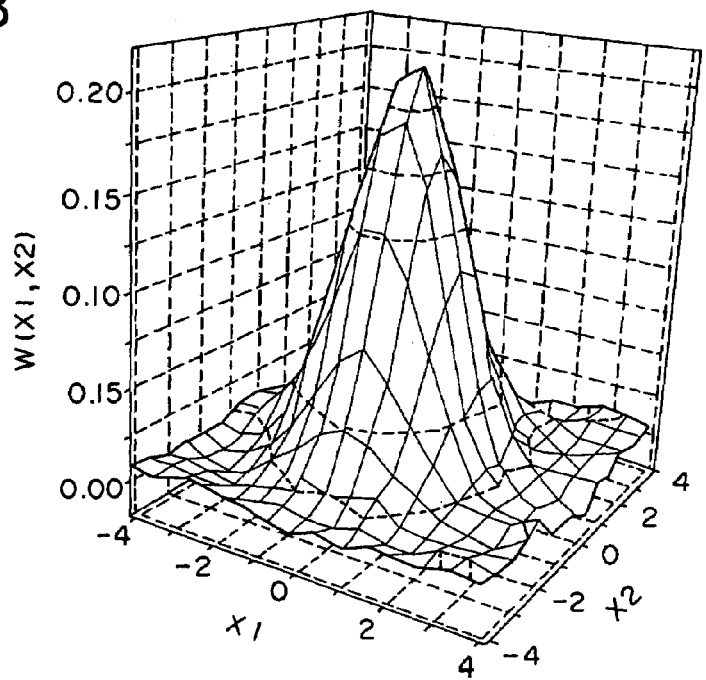

FIGS. 4A and 4B are graphical representations that illustrate typical measurement results that were obtained according to the first form of embodiment of the present invention. The graph of FIG. 4A shows a frequency distribution for the difference signal taken along the ordinate with respect to the voltage actually measured 5000 times and taken along the abscissa and the graph of FIG. 4B illustrates a Wigner distribution function derived by computer tomography from data that were obtained when such a measurement made to obtain the result shown in FIG. 4A were repeated 30 times.

The Wigner distribution function is one of the methods of representing a signal light in its quantum state, and the fact here that the Wigner distribution function was derived indicates that the signal light in its quantum state is actually observable.

In the observation in this form of embodiment of the invention, voltage values of the difference signal for 5000 (five thousands) output light pulses were measured to obtain a frequency distribution. FIG. 4A shows that the frequency distribution follows a Gaussian distribution. It should be noted that the abscissa of FIG. 4A has plotted along measured voltages which to allow direct comparison with the graph of FIG. 3 need to be corrected for the gain of amplifier and the intensity of the reference light.

On making such correction, it is confirmed that the width of the distribution observed (the magnitude of the fluctuation of the difference signal) agrees with the width that was predicted as the quantum fluctuation.

In deriving the Wigner distribution function shown in FIG. 4B, data were gathered from measurements that were repeated 30 times the measurements which measured the difference signal 5000 times while varying the optical path difference, hence the data from measurements of 150,000 output light pulses.

It is therefore seen that the present invention so far described in its first form of embodiment makes it possible to measure and observe a signal light in its quantum state by measuring it while varying its optical path difference, i.e., the difference in optical path between a reference light and the quantum signal light. And, since the Wigner distribution function of a given quantum signal light contains all the information knowledgeable or that can be known theoretically of the signal light, it is here rendered possible to detect the presence of a wiretapper with greater simplicity, thus from information on a change in the signal light.

An explanation is next given in respect of a process of quantum cipher operation or encryption according to the present invention.

FIG. 5 is a tabular diagram that illustrates a process of quantum cipher operation or encryption according to the present invention. There, in the left hand side column, numeral 1 is used to show that the row which follows right represents a phase modulation (change) made by a sender, numeral 2 (row 2) a phase modulation made by a recipient, numeral 3 (row 3) a sum total of the sender's and recipient's phase change or modulations, numeral 4 (row 4) a result of measurement by the recipient, numeral 5 (row 5) indicates that the sender is notified by the recipient on a public communication line of the recipient's added phase change and tells or have told the recipient about the sum total of the phase changes to make 0 or 180 degrees ○ or OK and to make 90 or 270 degrees X or NG (no good), numeral 6 (row 6) indicates that the recipient makes its privacy (or secret) key by assigning bit 1 to plus (+) and bit 0 to minus (−) when ○ (OK) is the case, and finally numeral 7 (row 7) indicates that the sender assigns bit 1 when its own phase modulation is 0 or 90 degrees and bit 0 when it is 180 or 270 degrees, thereby making its privacy key. It should be noted that here for the sake of simplicity the error rate is regarded as 0.

First, the sender by controlling the position of the mirror 3 shown in FIG. 1, randomly imparts to a quantum signal light S, phase changes 0, 90, 180 and 270 degrees (see the row 1 in the table of FIG. 5). On the other hand, the recipient by controlling the position of the mirror 5 imparts to a reference signal L, random phase changes 0 and 90 degrees (as shown in the row 2 of the table in FIG. 5). Then, the sum total of the difference in optical path between the reference and quantum signal lights L and S or the optical path difference of the system will be the difference between the phase changes or modulations which the sender and the recipient made, respectively (see the row 3 of the table in FIG. 5).

Further, the recipient applies to its measurement results a setting for the threshold values X− and X+ as described above, and gives the sign "−" if the difference signal mentioned above is found to be equal to or less than X− and gives the sign "+" if the difference signal is found to be equal or greater than X+ (as shown in the row 4 of the table in FIG. 5). Then, it can be seen that the sign + and the sign − are bound to appear in columns for the row 4 when the columns have for the row 3 the values 0 and 180 degrees, respectively, and that the sign + and the sign − appear at an equal probability in columns for the row 4 when the columns for the row 3 have the values of 90 and 270, respectively (see the rows 3 and 4 in the table of FIG. 5).

Then, the recipient in relation to the bit 0 or the bit 1 notifies the sender on the public communication line of which of 0 and 90 degrees of phase change imparted to the reference light in its phase modulation (see the column 5 in the table of FIG. 5).

The sender then notifies the recipient that the case is being adopted as a privacy key in which the total optical phase difference is either 0 or 180 degrees. That is, the sender notifies the recipient of the sign ○ or OK when the sum total of the phase changes or modulations is either 0 or 180 degrees and of the sign X or NG when it is either 90 or 270 degrees (see the row 5 in the table of FIG. 5).

The recipient applies the bit 1 to the sign + and the bit 0 to the sign − when ○ (OK) is the case and makes the same its privacy key (see the row 6 in the table of FIG. 5).

And, the senders gives bit 1 to its added phase changes of 0 and 90 degrees and bit 0 to those of 180 and 270 degrees and makes the same its privacy key (see the raw 7 in the table of FIG. 5).

As shown in FIG. 5, it will thus be seen that the privacy keys so produced as described above agree invariably with each other.

An explanation is next given in respect of a method of sensing a wiretap or eavesdropping On a quantum mechanical level, the principle applies that any measurement affects the object measured. And, since any performed attempt to wiretap or eavesdrop by a third party causes a change in its observing quantum signal, it is impossible for a third party to learn a privacy (secret) key contained in the signal being transmitted without being noticed by the sender and recipient.

The specific form of a change caused to the quantum signal varies depending on a particular step which the wiretapper attempts to take. For example, assume that the wiretapper is taking the step to obstruct or intercept a quantum signal light to read information it contain and then to resend the signal. Then, if the wiretapper attempts to make the same measurement as will be done by the recipient as mentioned above in order to read the signal information, its imparting a wrong signal modulation or change to the reference light signal (such as such that its added sum total to the sender's imparted signal modulation becomes 90 or 270 degrees) results in failure to resend the recipient the correct signal.

Also, because it is universally impossible from the principle of uncertainty relation to obtain information from both of the two amplitude components which are 90 degrees apart from each other, whatever step it is taking to read the information the wiretapper will be unable to acquire correct information, and from any such attempt there will appear of necessity an increase in the error rate. That is, there will only be a disagreement in privacy key between the sender and the recipient. For example, if the wiretapper is taking the step to once interrupt the signal light and then to resend the signal, a disagreement in privacy key does occur at a probability of 1/4 which is the product of probability: 1/2 to make an improper phase modulation and probability: 1/2 to resend any signal as a wrong signal.

Accordingly, from inconsistency found between their privacy keys on checking them in part the parties will be able to detect a third party's attempt to wiretap.

Also, it can be assumed that the wiretapper is taking the step to isolate and measure a portion of a signal light to acquire a portion of information en route and to offset a resultant loss of the signal light by amplification. This is a case in which any conventional quantum cipher is hard to detect wiretapping. In accordance with the present invention, however, such a wiretapping does appear as a change in the Wigner distribution function which enables the recipient to readily notice it. This is because a process of amplification is accompanied of necessity by an increase and decrease in the quantum fluctuation. It does appear as a increase and decrease in the dispersion or variance in measurement results as shown in FIG. 4A. As a result, the Wigner distribution function may in its graphical distribution become thicker or unsymmetrical about its peak value. Also, if the wiretapper makes the amplification only after it has access to definite information, the values X1 and X2 that make the peak value must vary.

An explanation is next given in respect of a second form embodiment of the present invention.

The second form of embodiment supposes using a single optical fiber for paths of signal transmission, and represents a practical form of implementation that is designed to permit a process of quantum cipher operation or encryption across a long distance for which the first form of embodiment if it remains as described above is hard to be practiced. To this end, the reference and quantum signal lights are split into both on the basic of time and as polarized, and are transmitted along the common optical path. The recipient signal processing operation and the process of quantum cipher operation are basically the same as those described above in connection with the first form of embodiment.

Besides the procedures by the sender and recipient of phase modulation and quantum ciphering, there are added operations to enhance the stability of an optical path difference and to monitor the quantum state by additionally giving preselected phase modulations.

To enhance the stability of a difference in optical path, a difference signal predicted if a preselected phase modulation is given is compared with an actual difference signal measured. The quantum state can be monitored by giving a uniformly changing phase modulation as a preselected phase modulation.

Figure 6:
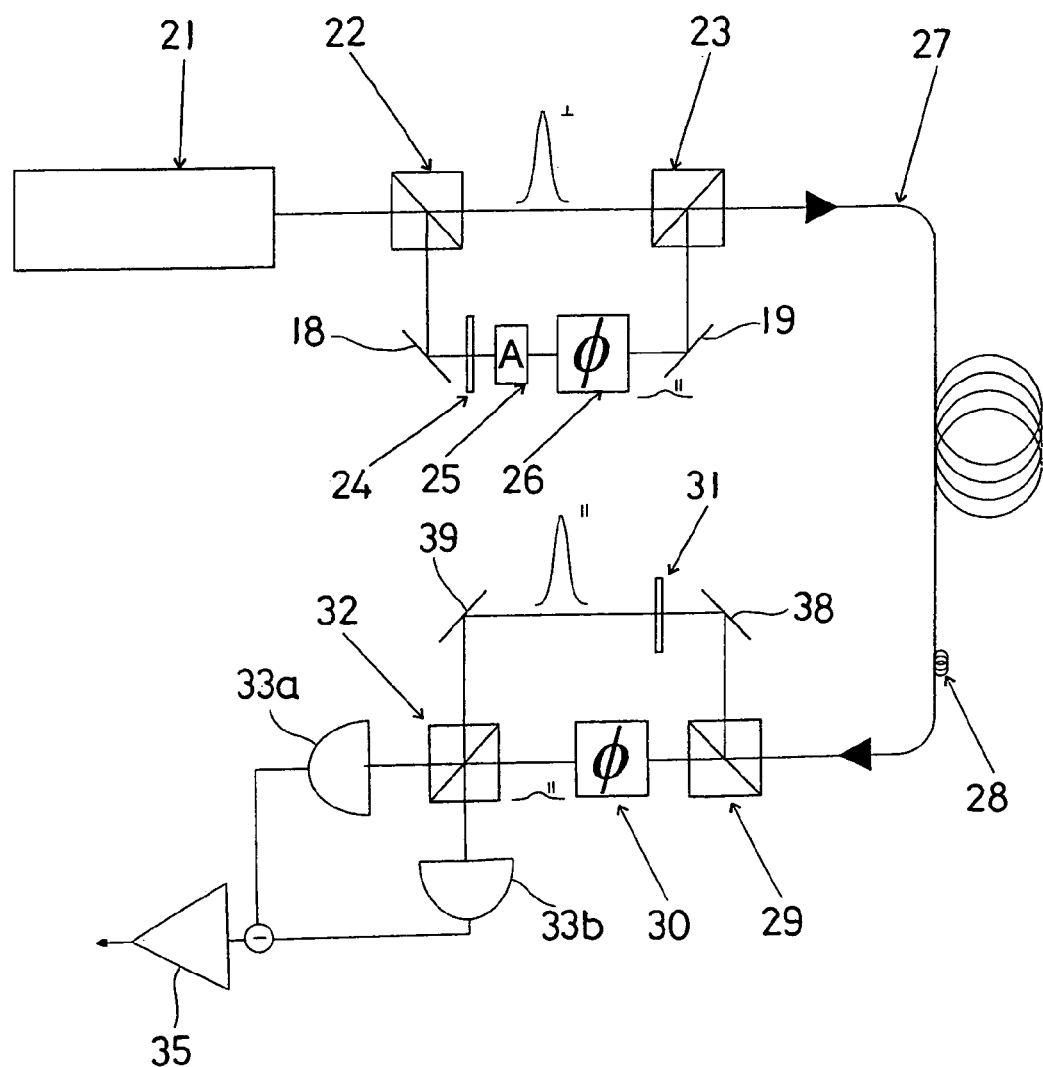
FIG. 6 is a schematic diagram that illustrates a second form of embodiment of the quantum cipher communication system according to the present invention.

FIG. 6 diagrammatically illustrates a quantum cipher system according to the second form of embodiment of the invention.

Referring to FIG. 6, the system according to the second form of embodiment includes in the sender's side a laser light source 21 that produces a linearly polarized pulsed light; a beam splitter 22 that splits the pulsed light into two signal lights, i.e., a reference signal light L and a quantum signal light S; a half-wave plate 24 that rotates the polarization of the signal light S by 90 degrees; a light attenuator 25 in which an absorbing medium weakens the intensity of the signal light S; a phase modulator 26 for changing the phase of the signal light S; and a polarized beam splitter 23 that returns the reference and quantum signal light L and S onto a common optical path or axis and then to make both the reference and quantum signal lights L and S incident into an optical fiber 27. Then, the quantum and reference signal lights S and L are polarized to lie orthogonal to each other and mutually spaced apart in time. In FIG. 6, reference characters 18 and 19 designate mirrors.

With the system constructed as described above, the quantum and reference signal lights S and L are allowed to travel in different paths only in the sender and recipient sides and each of a short distance and for the most part along a common path of transmission. Thus, a variation of the relative difference in optical path between the two signal lights can be made small.

Further, a phase modulation in which the value is later determined to eliminate any possible effect of a variation of the difference in optical path and a phase modulation for transmitting a privacy key are given.

The table in FIG. 7 shows a process of giving phase modulation in the system representing the second form of the present invention.

With reference to FIG. 7 for further explanation, numeral 1 in the left column is used to indicate that the row (row 1) that follows right represents a phase change or modulation the sender gives. The numerals underlined in the row 1 indicate phase changes for transmission of a privacy key. Numeral 2 (row 2) represents a phase modulation the recipient gives, Numeral 3 (row 3) represents a total sum of the sender's and recipient's given phase modulations, numeral 4 (row 4) represents a recipient's measurement result, numeral 5 (row 5) indicates that the sender is notified by the recipient on a public communication line of the recipient's added phase change and tells or have told the recipient about the sum total of the phase changes to make cases with 0 or 180 degrees ○ or OK and the sum total of the phase changes of not ○ or not 180 degrees, numeral 6 (row 6) indicates that the recipient makes its privacy (or secret) key by assigning bit 1 to plus (+) and bit 0 to minus (−) when ○ (OK) is the case, and finally numeral 7 (row 7) indicates that the sender assigns bit 1 when its own phase modulation is 0 or 90 degrees and bit 0 when it is 180 or 270 degrees, thereby making its privacy key.

In the case of a later determined phase modulation (found in the row 5 of the table in FIG. 7), the ability to predict an average value of difference signals permits making an estimate for a variation in the difference in optical path conversely from such an average value of actual difference signals measured.

Thus, even with a variation or fluctuation present in the optical path difference by reason of an external cause, it is still made possible to effect a correction such as to cancel its adverse effect.

It is possible to obtain the quantum state of a signal light by means of computer tomography from data for the difference signal in a varied phases.

It is thus seen that the present invention enables measuring or observing the quantum state of a signal light while making correction for a variation in its optical path difference simultaneously.

INDUSTRIAL APPLICABILITY

As will be apparent from the foregoing description, a quantum cipher communication system according to the present invention allows measuring or observing the quantum mechanical state of a transmission signal while permitting it to be detected at a substantially high quantum efficiency.

It is therefore seen that a quantum cipher communication system of the present invention is a highly useful cipher communication system that makes any attempt by a third party to wiretap or eavesdrop unsuccessful.

What is claimed is:

1. In quantum cipher communication using a light signal, a quantum cipher communication system, which comprises a sender's apparatus, a recipient's apparatus and a transmission path connecting between said sender's apparatus and said recipient's apparatus, and is characterized in that said sender's apparatus comprises:
  a light source for a laser beam;
  a beam splitting means for splitting said laser beam into said a weak signal light and said an intense reference light;
  a phase modulation means for imparting, a phase change on either said weak signal light or said intense reference light for every light of said laser beam and
  a light attenuation means for attenuating said weak signal light intensity, said recipient's apparatus comprises:
  a phase modulation means for imparting a phase change on either said weak signal light or said intense reference light for said every light transmitted from said sender's apparatus through said transmission path;
  a superimposing means for superimposing said weak signal light and said intense reference light, either of which is phase changed by said phase modulation means of said recipient's apparatus;
  a pair of photoconductive diodes for converting two output lights from said superimposing means into respective electric signals; and
  an amplifying means for amplifying a difference signal between said respective electric signals as said difference signal, wherein a sender, by using said phase modulation means of said sender's apparatus, imparts to either of said weak signal light or said intense reference light a phase change randomly selected from a set of phase changes predetermined by said sender and a recipient for said every light, and said recipient, by using said phase modulation means of said recipient's apparatus, imparts to either of said weak signal light or said intense reference light a phase change randomly selected from said set of phase changes for said every light, as well as measures said difference signal between said electric signals amplified by said amplifying means;

then, by using a public communication line, said recipient notifies said sender of said phase changes imparted by said recipient;

said sender calculates a total phase difference between said weak signal light and said intense reference light by adding said phase change made and notified by said recipient and said phase change made by said sender, and notifies said recipient of each a light whose total phase difference satisfy a total phase condition predetermined by said sender and said recipient, as a raw key candidate for being adopted as a privacy key;

then said recipient, for said each light notified as said raw key candidate, assigns bit 1 or bit 0 by comparing said difference signal thereof with threshold values +X and −X, as assigning bit 1 when said difference signal thereof is equal or greater than said threshold value +X, and assigning bit 0 when said difference signal thereof is equal or less than said threshold value −X, whereby said recipient gets a privacy key;

said sender, for said each light notified as said a raw key candidate, assigns bit 1 or 0 according to a condition regarding said total phase difference, which is predetermined by said sender and said recipient, whereby said sender gets a privacy key;

wherein said threshold values +X and −X are determined from a quantum-mechanical probability distribution;

wherein said eavesdropping is detected by said recipient measuring a change in a said quantum-mechanical probability distribution; and wherein said sender and said recipient can get a privacy key in common with suitable effective detection efficiency and suitable error rate by selecting said threshold values +X and −X.

2. In quantum cipher communication using a light signal, a quantum cipher communication system as set forth in claim 1, characterized in that said sender's apparatus further comprises:
  a movable mirror as said phase modulation means of said sender's apparatus; and
  a light attenuator as said light attenuation means, said transmission path comprising a pair of paths for transmitting said weak signal light and said intense reference light respectively, said recipient's apparatus further comprises:
  a movable mirror as said phase modulation means of said recipient's apparatus;
  a beam splitter as said superimposing means;
  said set of phase changes are 0, 90, 180, and 270 degrees, and
  said total phase condition is either 0 or 180 degrees.

3. In quantum cipher communication using a light signal, a quantum cipher communication system as set forth in claim 1, characterized in that said sender's apparatus further comprises:
  said light source for a linearly polarized pulsed light;
  a beam splitter for splitting said linearly polarized pulsed light into said weak signal light and said intense reference light as said beam splitting means;
  a first long optical path comprising a half wave plate for rotating the polarization of said signal light by 90 degrees, a light attenuator for attenuating said weak signal light intensity as said light attenuating means, a phase modulator making said weak signal light a phase change for every light of said linearly polarized pulsed light as said phase modulation means of said sender's apparatus, and mirrors; and
  a first polarized beam splitter for returning said weak signal light transmitted through said first long optical path and said intense reference light onto a common optical axis, wherein said weak signal light and said intense reference light returned to said common optical axis have a mutual time delay based on the optical path length difference between said first long optical path for said weak signal light and a first short optical path where said intense reference signal reaches to said first polarized beam splitter from said beam splitter, and have mutually orthogonal polarizations,
  an optical fiber comprising a single mode optical fiber connected to said first polarized beam splitter, wherein said weak signal light and said intense reference light are transmitted there-through, keeping said mutual time delay and said mutually orthogonal polarizations;

said recipient's apparatus further comprises:
  a second polarized beam splitter for splitting said weak signal light and said intense reference light transmitted through said optical fiber;
  a second long optical path comprising a half wave plate for rotating the polarization of said intense reference light transmitted through said optical fiber, and mirrors, and a second short optical path comprising a phase modulator for imparting a phase change on said weak signal light for said every light transmitted through said optical fiber as said phase modulation means of said recipient's apparatus, wherein the time delay based on the optical path length difference between said second short optical path and said second long optical path of said recipient's apparatus has the same absolute value and opposite sign to said mutual time delay in said sender's apparatus;
  a third polarized beam splitter for superimposing said weak signal light transmitted through said second short optical path and said intense reference light transmitted through said second long optical path as said superimposing means;
  said pair of photoconductive diodes for converting two output lights from said third polarized beam splitter into said respective electric signals; and
  an amplifier for amplifying a difference signal between said respective electric signals as said amplifying means,
  said set of phase changes are 0, 90, 180, and 270 degrees, and
  said total phase condition is either 0 or 180 degrees.

4. A quantum cipher communication system as set forth in claim 3, characterized in that a third light polarizer is provided in an output side of said single mode optical fiber for making a correction for a disturbance of polarization of said intense reference light.

5. A quantum cipher communication system as set forth in any one of claims 1 to 3, characterized in that in addition to said phase modulation of both said sender's and recipient's apparatuses used to transmit said privacy key, a phase modulation is imparted having a value later determined to make a correction for a fluctuation of the difference in optical path between said transmission path of said intense reference light and said transmission path of said weak signal light which develops by reason of an external cause.

6. A quantum cipher communication system as set forth in claim 5, characterized in that said phase modulation of both said sender's and recipient's apparatuses used to transmit said privacy key and said phase modulation to make a correction for said fluctuation are randomly repeated.

7. A quantum cipher communication system as set forth in any one of claims 1 to 3, characterized in that eavesdropping is detected on the basis of an increase in an error rate of said difference signal.

8. A quantum cipher communication system as set forth in any one of claims 1 to 3, characterized in that eavesdropping is detected on the basis of a change in a Wigner distribution function that indicates a quantum mechanical state of said weak signal light.

9. A quantum cipher communication system as set forth in any one of claims 1 to 3, characterized in that for said pair of photoconductive diodes, use is made of silicon photoconductor diodes when said light source has a wave length of 600 nm to 900 nm, and of InGaAs photoconductor diodes when said light source has a wave length of 1000 nm to 1500 nm.

10. A quantum cipher communication system as set forth in any one of claims 1 to 3, characterized in that said weak signal light has a typical intensity corresponding to as small as single photon, and said intense reference light has a typical intensity corresponding to photons as large as 10 millions in number.

* * * * *